April 14, 1970 R. J. RESCH 3,506,908
ELIMINATION OF SHORT CIRCUIT CURRENT OR POWER TRANSISTORS
IN PUSH-PULL INVERTER CIRCUITS
Filed May 20, 1968
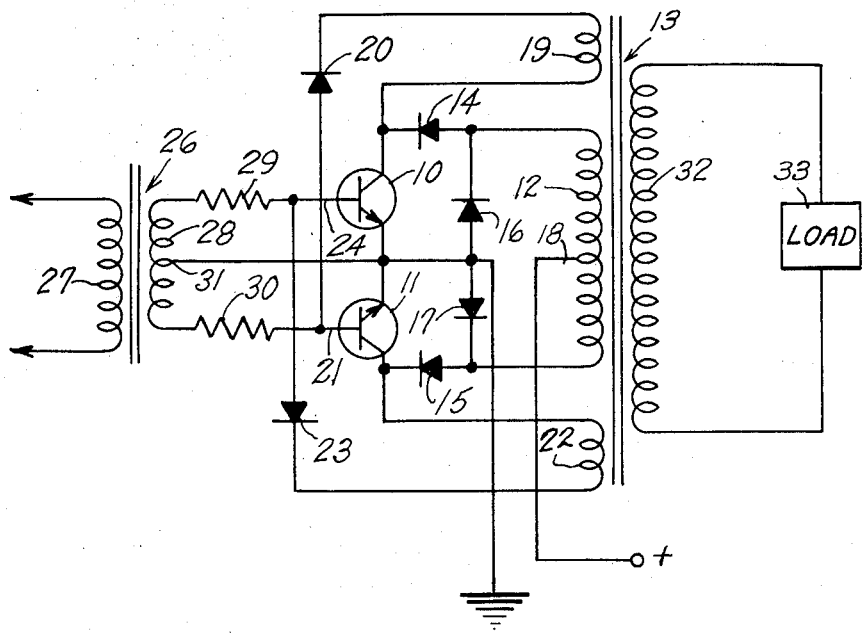
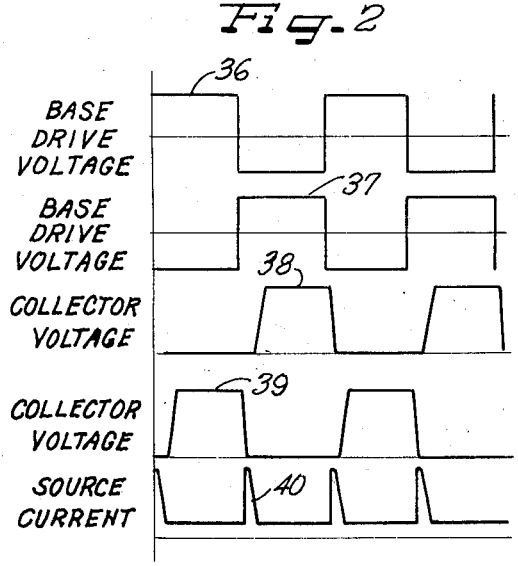
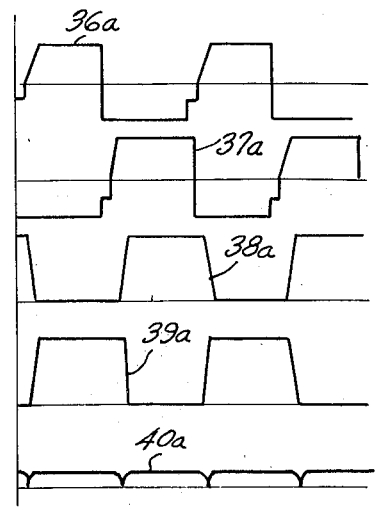
INVENTOR.
Robert J. Resch
BY *Hill, Sherman, Meroni, Gross & Simpson* ATTORNEYS United States Patent Office 3,506,908
Patented Apr. 14, 1970

3,506,908
ELIMINATION OF SHORT CIRCUIT CURRENT OF POWER TRANSISTORS IN PUSH-PULL INVERTER CIRCUITS
Robert J. Resch, Chardon, Ohio, assignor to TRW Inc., Cleveland, Ohio, a corporation of Ohio
Filed May 20, 1968, Ser. No. 730,319
Int. Cl. H02m 7/44
U.S. Cl. 321—45      7 Claims

ABSTRACT OF THE DISCLOSURE

An inverter circuit for changing DC to AC. The inverter includes a pair of electronic switch means connected in push-pull arrangement for causing current flow to pass through a primary winding in alternately opposite directions to generate an AC voltage at the output of a transformer. The conduction of one of the switch means is sensed and used to develop a feedback voltage which is applied to the control electrode of the other switch means to insure that the non-conducting switch is maintained non-conductive until the conducting switch is rendered non-conductive at which time the non-conducting switch will become conductive.

BACKGROUND OF THE INVENTION

Field of the invention

This invention relates generally to inverter circuits and more particularly to a new and improved inverter circuit which eliminates short circuit current of power transistors of the inverter circuit.

Description of the prior art

Heretofore, the efficiency of high frequency push-pull square wave inverter circuits has been reduced because of the short circuit currents which occur at the end of each half cycle of operation. This is due to the finite switching time associated with the power transistors of the push-pull circuit. These short circuit currents are limited by the lead inductance and transformer leakage inductance. Furthermore, the short circuit currents can degrade the rating of the power transistors by increasing their on and off losses. Due to the short circuit currents large voltage transients are created thereby requiring power transistors having an inverse voltage rating much greater than actually necessary. The voltage transients themselves are difficult to suppress and require additional circuitry not necessary for the operation of the inverter system.

SUMMARY OF THE INVENTION

Accordingly, one of the primary objects of the present invention is to provide an inverter circuit wherein the short circuit currents are eliminated. Another object of the present invention is to provide a new and improved inverter circuit having a minimum number of components and which operates with high efficiency.

Briefly, the inverter circuit of the present invention includes a pair of push-pull electronic switches, such as transistors, which are connected to the primary winding of a transformer to cause current flow in alternately opposite directions through the primary winding. Feedback circuits are provided which sense the conduction of one of the transistors and maintains the other transistor non-conductive until the conducting transistor becomes fully non-conductive.

Other objects, features and advantages will be more fully realized and understood from the following detailed description when taken in conjunction with the accompanying drawings.

BRIEF DESCRIPTION OF THE DRAWINGS

FIGURE 1 is a schematic circuit diagram illustrating an inverter circuit constructed in accordance with the principles of this invention;

FIGURE 2 is a diagrammatic representation of wave-shapes of an inverter circuit not utilizing the inventive concepts of the present invention;

FIGURE 3 is a diagrammatic representation of the wave-shapes of the inverter circuit of FIGURE 1.

DESCRIPTION OF THE PREFERRED EMBODIMENT

Seen in FIGURE 1 is an inverter circuit which includes a pair of transistors 10 and 11 connected in push-pull arrangement. The transistors 10 and 11 are connected to a primary winding 12 of a transformer 13. The collector conduction terminal of transistor 10 is connected to the primary 12 through a diode 14 and, the collector conduction terminal of transistor 11 is connected to the other end of the primary winding 12 through a diode 15. A diode 16 is connected in parallel with diode 14 and transistor 10 while a diode 17 is connected in parallel with the diode 15 and transistor 11. The primary winding 12 of transformer 13 includes a center tap connection 18 which is arranged for connection to a positive DC voltage source.

Connected to the junction of the transistor 10 and diode 14 is one lead of a feedback winding 19 which is part of the transformer 13. The other lead of the feedback winding 19 is connected to the cathode of a diode 20 which, in turn, has its anode connected to the base electrode 21 of the transistor 11. Similarly, the junction of transistor 11 and diode 15 is connected to a feedback winding 22 which is part of the transformer 13. The other lead of feedback winding 22 is connected to the cathode of a diode 23 which, in turn, has its anode connected to the base electrode of base electrode 24 of transistor 10.

A control transformer 26 has a primary winding 27 for receiving signal information to control the alternate conduction of transistors 10 and 11. The control transformer 26 includes a secondary winding 28 which has one end thereof connected to the base electrode 24 of transistor 10 through a resistor 29 and the other end thereof connected to the base electrode 21 of transistor 11 through a resistor 30. The secondary winding 28 is provided with a center tap 31 which is connected to ground potential.

During operation of the inverter circuit of FIGURE 1, an alternating current voltage is developed at a secondary winding 32 of transformer 13 and applied to a load 33.

A novel feature of the present invention is the use of the feedback windings 19 and 22 which maintain the non-conducting transistor non-conductive until the conducting transistor becomes non-conductive regardless of the potential applied to the base electrodes 21 and 24 from the control transformer 26. Although the preferred embodiment utilizes feedback windings on transformer 13, it will be understood that other feedback means may be incorporated to sense the conduction of one transistor to control the non-conduction of the other transistor.

Referring to FIGURE 2, assume that the feedback windings 19 and 22 and diodes 20 and 23 are not in the circuit. The base drive voltage applied to base electrode 24 is represented by the wave-shape 36, and the base drive voltage for the base 21 is represented by the wave-shape 37. The collector voltage of transistor 10 is shown by wave-shape 38 and is somewhat shifted in phase from the base voltage due to the finite switching time of the transistor. Similarly, the voltage developed at the collector of transistor 11 is shown by wave-shape 39. This also is somewhat shifted in phase due to the finite switching of the transistor. The overlapping conduction of the transistors 10 and 11 will produce a short circuit current between the transistors as indicated by wave-shape 40. The short circuit current will shunt the primary winding 12 of transformer 13 for a short period of time thereby decreasing the efficiency of the circuit.

Referring to FIGURE 3, the wave-shapes shown therein represent wave-shapes of the entire circuit of FIGURE 1 with the feedback windings 19 and 20 connected as shown. The wave-shape 36a at the base electrode 24 of transistor 10 is now a composite voltage of both the control signal voltage of transformer 26 and the feedback voltage of feedback winding 22. When the feedback voltage decreases to a point indicating the non-conduction of transistor 11, transistor 10 will then become conductive in response to the control signal of transformer 26. Similarly, the wave-shape 37a is a composite wave-shape of the voltage applied to base 21 from the control transformer 26 and the feedback voltage of feedback winding 19. The collector voltage of transistors 10 and 11 is shown by wave-shapes 38a and 39a which are now 180° out of phase one with the other thereby completely eliminating the short circuit currents as indicated by wave-shape 40a.

The inverter circuit of the present invention eliminates short-circuits for a load of any power factor rating.

In operation, consider transistor 10 conductive in the saturated mode of operation and the load current flowing through the upper portion of the primary winding 12 from a positive voltage source. At the end of the base drive half cycle, as indicated by wave-shape 36a, the base drive voltage is reversed across the base emitter junction of transistor 10 and applied to the base of emitter junction of transistor 11. However, since power transistor 10 is still saturated, the base voltage to transistor 11 is clamped down to some negative voltage due to the feedback winding 19. The base drive current of transistor 11 flows through resistor 30, diode 20, feedback winding 19 and through the conduction terminals of transistor 10 to ground potential. The base current of each of the transistors is the sum of the current from the control transformer 26 and the current from the feedback windings 19 and 22. Therefore, regardless of the finite switching time of the transistors used in the circuit arrangement of the present invention, the transistors will not be rendered conductive until the previously conducting transistor is completely non-conductive.

The blocking diodes 14 and 15 isolate the clamping circuit from the primary winding 12 of transformer 13 and insure that the base drive clamping current flows through the power transistors rather than the primary winding 12. The blocking diodes can be eliminated if the load 33 is resistive or inductive. However, with a capacitive load, the diodes 14 and 15 are required.

Accordingly, the present invention provides means for eliminating short circuit currents between power transistors of an inverter circuit. It will be understood that variations and modifications may be effected without departing from the spirit and scope of the novel concepts of this invention.

I claim as my invention:

1. An electronic inverter for changing DC to AC, comprising: first and second electronic switch means each including conduction terminals and a control terminal; a transformer having primary and secondary windings, said primary winding having one end thereof connected to one of the conduction terminals of said first electronic switch means and the other end of said primary winding connected to one of the conduction terminals of said second electronic switch means, and said secondary winding arranged for connection to a load; first circuit means connected to the other conduction terminal of said first and second electronic switch means for connecting said first and second electronic switch means to a DC voltage source; second circuit means connected to the control terminals of said first and second electronic switch means to alternately render said first and second electronic switch means conductive and non-conductive and in opposite conductive senses one from the other; first feedback means comprising a first feedback winding on said transformer response to the conduction of said first electronic switch means and connected to the control terminal of said second electronic switch means; and second feedback means comprising a second feedback winding on said transformer responsive to the conduction of said second electronic switch means and connected to the control terminal of said first electronic switch means; whereby, responsive to said first and second feedback means, said first electronic switch means will not become conductive until said second electronic switch means becomes non-conductive, said second electronic switch means will not become conductive until said first electronic switch becomes non-conductive, first and second blocking diodes connected in series with each of said first and second feedback windings, a third blocking diode connected in series between said first electronic switch means and the end of said primary winding, and a fourth blocking diode connected in series between said second electronic switch means and the other end of said primary winding.

2. An electronic inverter according to claim 1 wherein said first and second electronic switch means are transistors.

3. An electronic inverter circuit according to claim 1 comprising fifth and sixth diodes connected back-to-back across said primary winding.

4. An inverter circuit for changing DC to AC, comprising: first and second electronic switch means each having cathode, anode and control electrodes, said first and second electronic switch means being arranged in push-pull relation; a transformer having a primary winding which has one end thereof connected to said first electronic switch means and the other end thereof connected to said second electronic switch means, and a center tap connectable to a DC voltage source; circuit means connected to the control electrode of said first and second electronic switch means to develop control signal information which alternately changes the state of conduction of said first and second electronic switch means and in opposite conductive senses one from the other; feedback means formed by first and second feedback windings on said transformer responsive to one of said first and second electronic switch means during its period of conduction to control the non-conduction of the other of said first and second electronic switch means, first and second blocking diodes connected in series with each of said first and second feedback windings, a third blocking diode connected in series between said first electronic switch means and one end of said primary winding, and a fourth blocking diode connected in series between said second electronic switch means and the other end of said primary winding.

5. An inverter circuit according to claim 4 wherein said first and second electronic switch means are transistors.

6. An inverter circuit for changing DC to AC, comprising: first and second electronic switch means each having cathode, anode and control electrodes, said first and second electronic switch means being arranged in push-pull relation; a transformer having a primary winding which has one end thereof connected to said first electronic switch means and the other end thereof connected to said second electronic switch means, and a center tap connectable to a DC voltage source; circuit means connected to the control electrode of said first and second electronic switch means to develop control signal information which alternately changes the state of conduction of said first and second electronic switch means and in opposite conductive senses one from the other; and feedback means formed by first and second feedback windings on said transformer responsive to the operation of one of said first and second electronic switch means during one state of operation to control the operation of the other of said first and second electronic switch means, first and second blocking diodes connected in series with each of said first and second feedback windings, a third blocking diode connected in series between said first electronic switch means and said one end of said primary winding and a fourth blocking diode connected in series between said second electronic switch means and said other end of said primary windings.

7. An inverter circuit according to claim 6 wherein said electronic switch means are transistors.

References Cited

UNITED STATES PATENTS

| 3,317,856 | 5/1967 | Wilkinson | 32—45 XR |
| 3,350,661 | 10/1967 | Bloom et al. | 321—44 XR |
| 3,351,839 | 11/1967 | Jonhson et al. | 321—45 |
| 3,361,952 | 1/1968 | Bishop | 321—45 |
| 3,383,624 | 5/1968 | Fiala | 321—2 XR |
| 2,785,236 | 3/1957 | Bright et al. | |

LEE T. HIX, Primary Examiner

W. M. SHOOP, JR., Assistant Examiner

U.S. Cl. X.R.

331—113

UNITED STATES PATENT OFFICE
CERTIFICATE OF CORRECTION

Patent No. 3,506,908           Dated April 14, 1970

Inventor(s) ROBERT J. RESCH

It is certified that error appears in the above-identified patent and that said Letters Patent are hereby corrected as shown below:

Claim 1, column 4, line 10, cancel "response" and insert

--responsive--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents